United States Patent [19]

Randtke et al.

[11] Patent Number: 5,041,267

[45] **Date of Patent: * Aug. 20, 1991**

[54] ULTRA HIGH PURITY REAGENT CONTAINER WITH LARGE BREAKSEAL

[75] Inventors: Peter T. Randtke, La Costa; Hans-Juergen Graf, Oceanside, both of Calif.

[73] Assignee: Air Products and Chemicals, Inc., Allentown, Pa.

[ * ] Notice: The portion of the term of this patent subsequent to Sep. 29, 2004 has been disclaimed.

[21] Appl. No.: 248,686

[22] Filed: Sep. 23, 1988

Related U.S. Application Data

[63] Continuation-in-part of Ser. No. 948,120, Dec. 30, 1986, abandoned.

[51] Int. Cl.[5] .................... G05D 16/00

[52] U.S. Cl. .................... 422/102; 422/112; 220/610; 220/625

[58] Field of Search .................... 422/102, 112, 99; 220/625, 610

[56] References Cited

U.S. PATENT DOCUMENTS

| | | | |
|---|---|---|---|
| 3,051,351 | 8/1962 | Finkenzeller | 220/610 |
| 4,121,634 | 10/1978 | Hayes et al. | 141/392 |
| 4,696,411 | 9/1987 | Graf et al. | 422/99 |
| 4,851,821 | 7/1989 | Howard et al. | 264/79 |
| 4,859,375 | 8/1989 | Lipisko et al. | 261/52 |
| 4,886,178 | 12/1989 | Graf | 53/471 |

*Primary Examiner*—Richard V. Fisher
*Assistant Examiner*—John J. Bruckner
*Attorney, Agent, or Firm*—James C. Simmons; William F. Marsh

[57] ABSTRACT

A container for high purity chemicals has a quartz or glass breakseal tube, the end of the tube interior of the container forming a thin annular edge, and a glass or quartz disk fused to said thin annular edge closing the tube. The glass or quartz tube is constructed and adapted to receive, in use, an inner tube disposed in the glass or quartz tube; the disk, glass or quartz tube being of such construction that, in use, the disk is broken off the thin annular edge upon application of force thereto by the inner tube.

7 Claims, 2 Drawing Sheets

ULTRA HIGH PURITY REAGENT CONTAINER WITH LARGE BREAKSEAL

CROSS-REFERENCE TO RELATED APPLICATION

This is a continuation-in-part of co-pending U.S. patent application Ser. No. 948,120 filed Dec. 30, 1986, now abandoned to which priority is claimed.

BACKGROUND OF THE INVENTION

It is well known in the art to carry out certain semiconductor and manufacturing operations under conditions of high or moderate vacuum. One of the conventional processes in carrying out such operations is to introduce a reagent vapor into the vacuum system where the vapor reacts with the semiconductor devices undergoing treatment or preparation.

Reservoirs in the form of bubblers and in other forms are well known in the industry. One of the industry standards is the quartz bubbler sold by J. C. Schumacher Company. Such bubblers may be used in connection with the system described in the aforementioned co-pending patent application.

The prior art systems are generally suitable for use and in shipment, but where the chemical reagents contained in the container is toxic, flammable or otherwise hazardous, a greater measure of safety is greatly to be desired, and may be necessary for adequate safety with respect to the shipping of certain reagents.

Breakseals on quartz or glass containers are known, and a unique breakseal arrangement is involved in the J. C. Schumacher Company bubbler design. Such breakseals, however, are limited to rather small diameters. An important feature of this invention is a large diameter breakseal which obviates the introduction of small particles into the reagent vessel.

Another important feature of the present invention is that the breakseals are able to withstand very large hydraulic forces such as may occur when the inertia of the contents causes the contents to move with considerable force against the seal such as may occur when the container is dropped or motion is otherwise decelerated rapidly.

SUMMARY OF THE INVENTION

The present invention comprises a breakseal comprising a glass or quartz tube having formed at an end thereof a thin edge and a disk fused to the thin edge.

Specifically, the present invention is embodied in an improved container for high purity chemicals having an opening defined by a quartz or glass tube, the improvement comprising a breakseal on the glass or quartz tube, the tube having one end formed in the form of a thin annular edge either on the most extreme end of the tube or in conjunction with an end edge of the tube, and a glass or quartz disk fused to said thin annular edge closing the tube. In use an inner tube disposed in the glass or quartz tube and means for forcing the inner tube against the disk are provided. The disk, glass or quartz tube and the inner tube being of such construction and composition as will permit the disk to be broken off the thin annular edge upon application of force thereto by the inner tube. The break seal may be very thick or may be pre-formed in a configuration which is very resistant to rupture from any force internal to the container. In one preferred embodiment, the disk is several times thicker than the thin fused edge joining the disk to the tube.

DESCRIPTION OF THE PREFERRED EMBODIMENT

Figure 1:
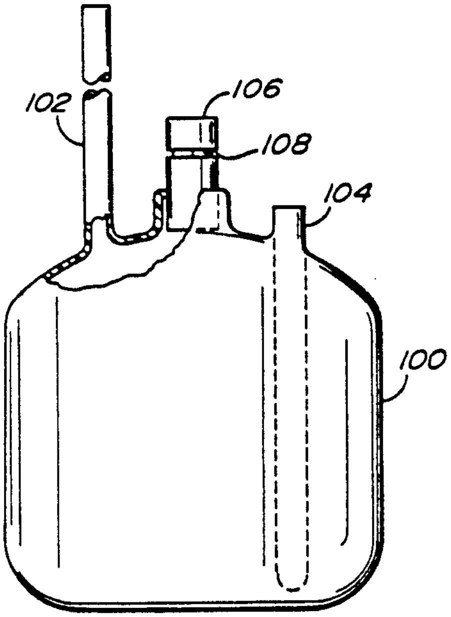
FIG. 1 is a side view, partially cut away and in cross-section, depicting a simple, but exemplary, container of the type in which the present invention may be used.
Figure 2:
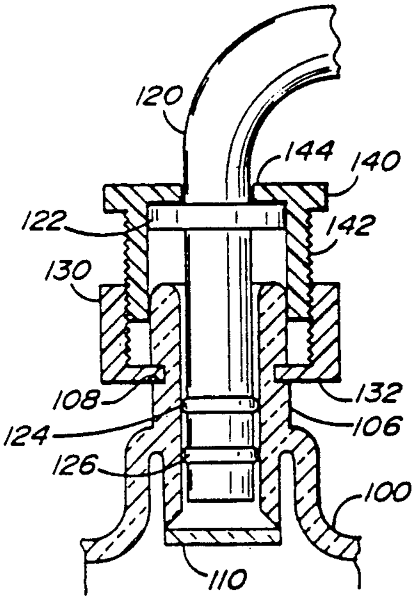
FIG. 2 is an enlarged crossed-sectional view of the neck of the container of FIG. 1 depicting the container in use, having a tube received in the tube which forms the neck of the container, before opening the container.
Figure 3:
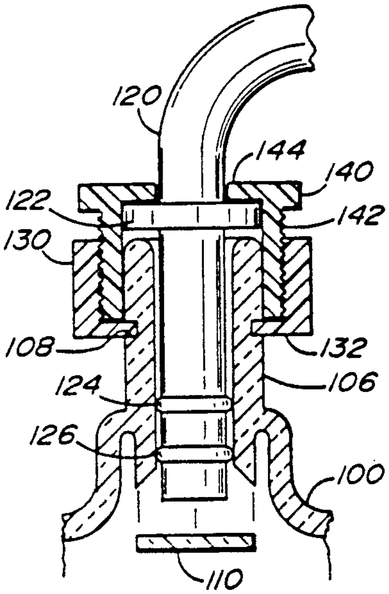
FIG. 3 is an enlarged cross-sectional view corresponding to FIG. 2, depicting the opening of the break-seal.

Reference is made, first, to FIGS. 1-3. FIG. 1 depicts a glass or quartz container generally of the type with respect to which the present invention may be used. It should be understood, however, that the particular configuration of the container, other than the breakseal portion thereof, is of absolutely no criticality with respect to the present invention, and that the container of FIG. 1 is depicted nearly as an exemplary embodiment.

The container 100 may contain an inlet tube 102 which is fused to seal the container after the container is filled. The container 100 may also, include a temperature-sensing well 104 adapted to receive a thermometer, or adapted to receive a level indicator. These features are, of course, of no consequence with respect to the present invention.

The container 100 includes a tube 106 which forms the neck or opening of the container. While not necessary to the operation of the invention, it is convenient to provide a groove 108 which will be utilized in the opening of the container, as will be described hereinafter.

Now, referring particularly to FIGS. 2 and 3, which depict the container in use during the opening stage thereof. A tube 120 which is adapted to be received in the tube 106 but otherwise is of no particular consequence as to configuration, is received in the tube 106. The tube 120 has, in the preferred embodiment, a flange 122 which, of course, will be an annular flange around the tube. The tube 120 is, preferably, sealed in the tube 106 by one or two, or more. O rings, such as are depicted at 124 and 126.

In the preferred embodiment, a threaded connector 130 which has an internally extending flange 132 is received on the neck 106 of the container in the groove 108. The connector may be made of any material being depicted as being made of a polymer. The internally extending structure 132 may be integral with the connector 130, the entire structure being formed of a polymer which is sufficiently flexible or deformable to permit it to slip over the neck 106 to engage in the groove 108. Alternatively, the engaging structure 132 may be separable from the connector 130 and attached thereto after engagement in the slot 108. The particular structure involved here is not critical with respect to the present invention.

Also in the preferred embodiment, in use, another connector 140 is threadably engaged, as shown at 142, with the connector 130. The connector 140 has an internally extending structure, which may be in the form of a flange 144, or any other structure, which engages the top of the annular flange 122.

In use, the tube 120 is inserted into the internal structure of the tube 106 which forms the neck of opening of the container, the O rings, or some other sealing device of suitable structure, provides a seal between the tube 120 and the internal surface of the tube 106. The tube 120 and that portion of the tube 106 which is in communicaiton therewith is evacuated, or filled with a gas which is inert to the reagent in the container. In operations where ultra high purity is highly critical, alternate flushing and evacuation may be effected to assure that the tube 120 and that portion of the tube 106 which is in communication therewith is free of any possible contaminating gas, or other material.

Once a suitable state of purity or inertness is achieved in the tube 120 and the communicative portion of the tube 106, the connector 140 is turned and the tube 120 is forced downwardly into the tube 106, as shown in FIG. 3. As the force is exerted upon the disk 110, which seals the end of the tube 106, the very thin fused portion which joins the end of the tube 106 with the disk 110 is broken and the disk, intact, as a single piece, or substantially as a single piece, is forced into the container. This operation opens the container to fluid communication with the conduit or tube 120, without ever exposing the contents of the container to the surrounding atmosphere.

While the disk 110 may be of a number of configurations, the significant advantages of the present invention are best achieved is the disk is either several times thicker than the fused seal between the disk and the end of the tube, or is otherwise constructed and configured such that the disk is highly resistant to hydraulic forces which may occur inside the container as a result of inertia when the velocity or momentum of the container is drastically altered, as may occur when the container is dropped, or the conveyance in which the container is being carried drops rapidly. It will be apparent from the structure just described that it would be virtually impossible for any internal hydraulic force to rupture the seal formed by the disk 110 fused to the end of the tube 106, but that a relatively minor force is required on the internal portion of the disk, i.e. internal with respect to the tube 106, to force the disk off the end of the tube and thereby open the container.

Figure 4:
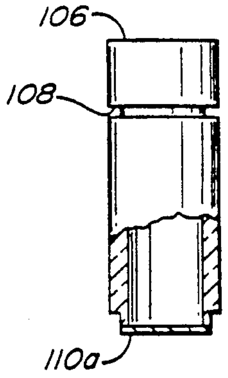
FIG. 4 and 5 are cross-sectional views of the end of the tube of the container depicting two alternative constructions of the tip and disk thereof.
Figure 5:
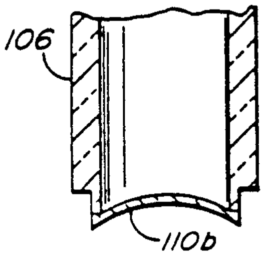

Alternative embodiments are shown if FIGS. 4 and 5 to which reference is now made. The structure is identical as previously described, except that the manner in which the tip of the tube is thinned differs. In FIG. 2, for example, the tip of the tube tapers to a fine edge whereas in FIG. 4, the tip of the tube is annularly thinned.

A slight variation of the structure shown in FIG. 4 is shown in FIG. 5 where the disk **110*b* is arcuately formed whereas the disk 110*a* in FIG. 4 is flat. Referring to FIG. 5, the disk 110*b* may have an arcuate portion convex internally of the tube 106, the disk may equally well be arcuate externally with respect to the inside of the tube 106**. The arcuate configuration is simply one way of achieving a structure wherein the disk, in use, is broken away from the tip of the tube in an integral unit, substantially intact, with only one piece, rather than a large number of shattered pieces of glass fragments.

Figure 6:
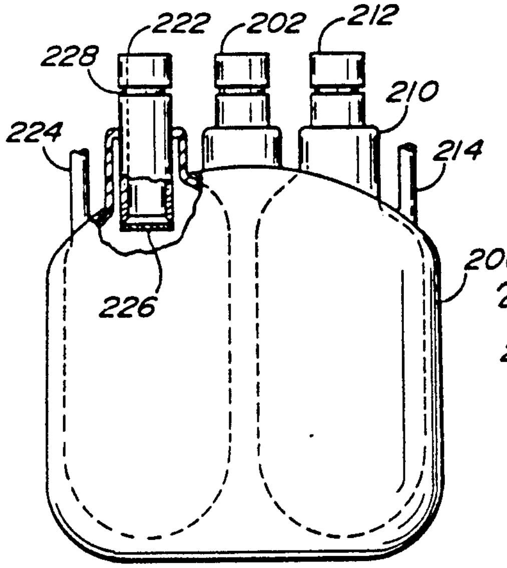
FIG. 6 is a side view, partially cut away, of a multiple reservoir container which is one alternative type of container contemplated by this invention.
Figure 7:
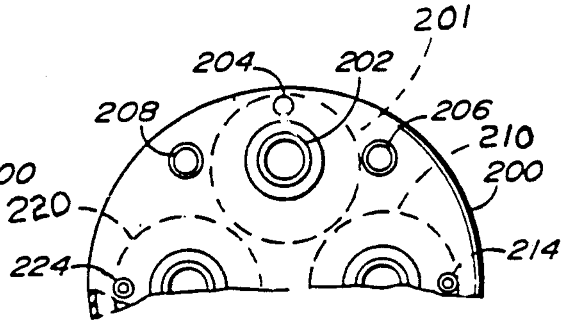
FIG. 7 is a partial top view of the multiple reservoir apparatus of FIG. 6, in partial cut away, showing one half of the top, including the top of the three reservoirs.

Referring to FIG. 6, an outer container 200 forms a first vessel, inside which another vessel 201 resides. An opening 202, which is identical to openings 212 and 222, the latter of which will be described in complete detail hereinafter, is provided for removing vapors from the reservoir 201 during use. A fill tube 204, which, in operation, is simply a long open tube through which reagent is introduced into the reservoir after which the fill tube is closed off, typically by heat sealing.

A thermal well 206 is provided into which a temperature sensing probe can be positioned an another well 208 is provided into which an optical level measuring device may be inserted. These are simply tubes, closed at the bottom, and, therefore, sealed to prevent inclusion of the reagent, which are utilized in measuring the temperature and level of the reagent. Such wells are known in the prior art and, per se, are not novel, except in combination with the other features of this particular embodiment of the invention.

Another vessel 210 is formed inside and connected to the top wall of the vessel 200 and is provided with a vapor removal conduit 212, which is the same as conduit 202 and 222. A fill tube 214, as previously described with respect to fill tube 204 is also provided for this vessel.

In like manner, a vessel 220, with a vapor removal conduit 222 and a fill tube 224 are provided. It will be seen that the combination comprises a unitary vessel comprising an outer reservoir with two reservoirs suspended from the top wall of the vessel in the outer reservoir, forming three separate and distinct reservoirs, each of which has a fill tube and each of which is provided a vapor removal conduit.

The lower end of the vapor removal tube is tapered out to a fine edge. The taper may be toward the outer edge, the inner edge, or may be generally centered with respect to the thickness of the wall of the vapor removal tube 222 provided only that a knife edge, in annular configuration, is formed to which a closure disk 226 is fused. This combination forms a very unique and advantageous breakseal. First of all, the breakseal 226 on the end of the tube 222 is comparably thick and may be as thick as or thicker than the walls of the tube and, therefore, can withstand virtually and expected internal pressure. As shown, the disk is several times thicker than the thin fused edge joining the disk to the tube. In particular, it can withstand the forces of hydraulic pressure applied during movement of the vessel and the relative movement therein of the liquid contained in the vessel. This has been a serious problem in the past, and the present invention provides a unique, unexpected and very avantageous solution to this problem.

Figure 8:
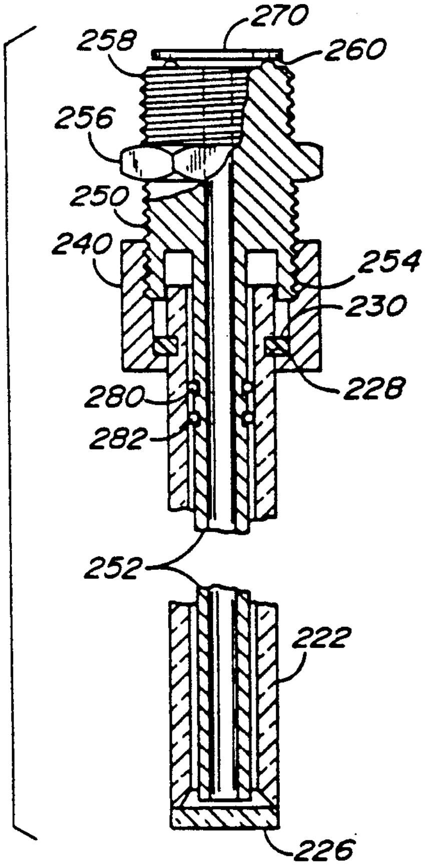
FIG. 8 is a side view partially in cut away and cross section of the embodiment of improved breakseal of the invention as shown in FIG. 6, depicting a breakseal wherein the disk is several times thicker than the thin fused edge joining the disk to the tube.
Figure 9:
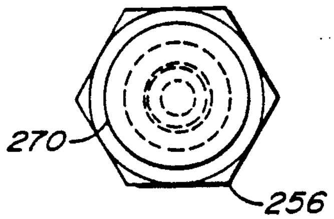
FIG. 9 is a top view of the connector shown in FIG. 8.
Figure 10:
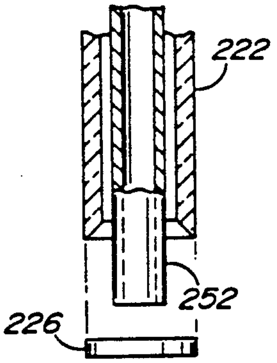
FIG. 10 is a side view partially in cut away and cross section of the embodiment of improved breakseal of the invention as shown in FIG. 8 depicting the operation thereof.

Another important facet of this particular feature of the invention resides in the matter of breaking the breakseal. While the breakseal may be broken in any of many ways, one particular advantageous apparatus in system for breaking the seal is shown in FIGS. 8, 9, and 10. As shown in FIG. 6, there is a groove 228 formed in the out wall of the vapor removal tube 222. As shown in FIG. 8, that groove 228 has residing in it a retaining ring 230 which may be of any polymeric or even metal material. Polymer, such a polytetrafluoroethylene, sold under the trademark TEFLON, or any other desired polymer are preferred. The retaining ring or washer 230 resides in the groove 228. The retainer washer 230 retains on the vapor removal tube 222 a nut or retainer 240 which is threaded on its internal surface. Obviously, parts may be reversed and the threading may be on the outside, but it is conveniently shown here on the inside.

The nut fits on a connector 250, which includes a down tube 252 which extends proximate of the end of the vapor removal tube 222, as shown in FIGS. 4 and 6. An outer portion of the connector 250 is threaded and is threadably engaged by the threads on the nut 230. A hexagonal or other gripping surface 256 may be provided and an upper threaded surface 258 may also conveniently be provided for connecting the connector to any kind of tubing or conduit system desired. Since this is a conventional VCR connector from this point on, the description is omitted for sake of brevity and clarity. Briefly, however, an annular rib 260 is formed on the end of the body, and a washer 270 of some deformable material, which may be metal or polymer, for example, is placed thereon, and a mating fitting, which would be substantially identical, if desired, with respect to the threaded end 258, is provided for engaging the other side, the top side as shown in FIG. 8, of the washer 270. The two portions mate together and are forced together by a nut which threadably engaged the portion 258. As indicated, this is a conventional connector and there is no novelty per se in the assembly shown at the top of FIG. 8.

An important facet of the invention, however, comprises the assembly of means for extending outwardly all the vapor removal tube 222, means secured, as for example by the washer 230, over the end of the vapor removal 222, i.e. the nut 230 and for moving the body, and particularly, it's downwardly extending portion 252. Sealing O rings 280 and 282, formed in grooves in the outer wall of the down tube 252 are provided to provide a sealing relationship between the interior of the vapor removal tube and the exterior of the down tube 252.

In use, the nut 240 is slipped over the end of the vapor removal tube and the retaining ring 230, which is tyupically at least somewhat resilient, is slipped over the end of the tube 222 and engaged in the groove 228. The body 250 is then placed in position with the down tube 252 extending down into the vapor removal tube, seals being formed by the O rings 280 and 282. The nut 240 is screwed on the body 250, in the area indicated at 254, where the two have mating threaded surfaces, thus forcing the body 250 down. As shown in FIG. 8, the tip of the down tube 252 is just barely clearing the breakseal 226. By further screwing down the body, the breakseal forces the disk 226 downwardly as shown in FIG. 10, breaking the fused portion around the end of the tube 222 and moving the disk breakseal 226 downwardly as shown in the arrow in FIG. 10. The seal having previously been formed, this procedure obviates any introduction of impurities into the system. One of the great advantages of this particular breakseal is that it can be made in virtually any desired size. All that is necessary is to provide an adequate thickness in the breakseal disk 226. Since this is simply a flat disk, it is easily obtained in any desired thickness.

The system of FIG. 6 is particularly valuable where multiple reagents are used. For example, one of the important techniques used in the manufacture of semiconductors now is in the formation of BPSG (borophosphosilicate glass) in the formation of this glass coating on semiconductor devices, the boron containing constituent is contained in one reservoir, the phosphorous containing constituent is contained in another reservoir and the silicate containing constituent is contained in still another reservoir, the three constituents being introduced into the vacuum simultaneous therein reacting to form the borophosphosilicate glass. For example, the reservoirs may contain, respectively, boron tribromide, phosphorus tribromide, and tetraethyl (ortho) silicate.

It will also be understood that separate reservoirs and separately heated reservoirs may be used in a combination system of the type shown in FIG. 6, the only difference being that each reservoir is separate from the other.

INDUSTRIAL APPLICATION

This invention finds application in the manufacture of semiconductors and in providing reagents in vacuum furnaces and other systems.

What is claimed is:

1. A breakseal comprising a glass or quartz tube having a generally cylindrical cross-section with a wall of generally uniform thickness, said tube having formed at an end thereof a thin annular edge, said edge formed by having said wall at said end reduced in thickness; and a glass or quartz disk fused to said end of said tube, said breakseal being so constructed and arranged that in use when pressure is applied to said disk in a direction along the longitudinal axis of said tube, said disk separates from said tube in a single piece.

2. The breakseal of claim 1 wherin the disk is thicker than the thickness of said end of the tube to which the disk is fused.

3. In a container for high purity chemicals having an opening defined by a quartz or glass tube, the tube having a generally cylindrical cross-section and a wall of generally uniform thickness, the improvement comprising:

a breakseal comprising a glass or quartz having an end, said end of the tube being located in the interior of the container and having a portion of the wall at the end thereof of reduced thickness so as to form a thin annular edge, and a glass or quartz disk fused to said portion of the wall of the tube thus closing said end of the tube, the glass or quartz tube being constructed and adapted to receive, in use, an inner tube disposed in the glass or quartz tube, the disk, glass or quartz tube and inner tube being constructed and arranged such that, in use, the disk is broken off the end of the glass or quartz tube upon application of force thereto by the inner tube.

4. The container of claim 3 wherein the disk is thicker than the thickness of said portion of the wall of the tube to which the disk is fused.

5. The container of claim 3 wherein the breakseal is so constructed and configured that, in use, the disk remains substantially intact as a single piece when broken from the tube.

6. The container of claim 3 wherein the glass or quartz tube has the portion of the wall of reduced thickness formed by an annular groove in the outer wall of said tube at said end.

7. The container of claim 3 wherein the glass or quartz tube has the portion of the wall of reduced thickness formed by grinding the interior wall of said tube by means of a conical tool.

* * * * *